US008718042B2

(12) United States Patent
Strebel et al.

(10) Patent No.: US 8,718,042 B2
(45) Date of Patent: May 6, 2014

(54) EXTENSIBLE AND SECURE TRANSMISSION OF MULTIPLE CONVERSATION CONTEXTS

(75) Inventors: Andreas Strebel, Zurich (CH); Ankit Tandon, Bellevue, WA (US); Pradipta K Basu, Redmond, WA (US); Sundar Anantharaman, Bellevue, WA (US); Aatif Awan, Bellevue, WA (US); Lokesh Srinivas Koppolu, Redmond, WA (US); Rajesh Ramanathan, Redmond, WA (US); Ramesh Vyaghrapuri, Kenmore, WA (US); Srivatsa Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 12/117,727

(22) Filed: May 8, 2008

(65) Prior Publication Data

US 2009/0279533 A1 Nov. 12, 2009

(51) Int. Cl.
*H04L 12/66* (2006.01)

(52) U.S. Cl.
USPC .......... 370/352

(58) Field of Classification Search
USPC .......... 345/751; 709/229, 205, 219, 204, 201, 709/246, 228, 227, 203, 206; 370/352, 261, 370/353, 276; 707/104.1; 725/62, 142; 705/26; 715/781; 379/265.03, 88.13, 379/265.04, 265.01, 265.11; 455/556, 457; 710/1; 704/235; 700/94; 340/573.1
See application file for complete search history.

(56) References Cited

U.S. PATENT DOCUMENTS

| | | | | |
|---|---|---|---|---|
| 5,432,845 | A | 7/1995 | Burd et al. | |
| 5,987,115 | A * | 11/1999 | Petrunka et al. | 379/265.04 |
| 6,256,381 | B1 * | 7/2001 | Donaghue, Jr. | 379/265.01 |
| 6,442,269 | B1 * | 8/2002 | Ehrlich et al. | 379/265.03 |
| 6,625,141 | B1 | 9/2003 | Glitho et al. | |
| 6,708,200 | B1 * | 3/2004 | Ura et al. | 709/203 |
| 6,847,713 | B1 | 1/2005 | Cutting et al. | |
| 7,154,864 | B2 * | 12/2006 | Costa-Requena et al. | 370/261 |
| 7,194,070 | B2 | 3/2007 | Starbuck et al. | |

(Continued)

FOREIGN PATENT DOCUMENTS

JP 2006109244 A * 4/2006 ................ H04L 9/08

OTHER PUBLICATIONS

Gonter, "Session Initiation Protocol (SIP) in the Contact Center", Mar. 20, 2007, Enaxis Consulting, 2007.

(Continued)

*Primary Examiner* — Asad Nawaz
*Assistant Examiner* — Parth Patel
(74) *Attorney, Agent, or Firm* — Sonia Cooper; Peter Taylor; Mickey Minhas

(57) ABSTRACT

The entry and transmission of notes to recipients along the conversation chain. Notes can be created based on an incoming caller. The notes can be transmitted to the conversation recipient for viewing before, during, and after the recipient accepts the conversation. This is facilitated by a communications client that operates to allow entry of the notes, and forwarding of the call recipient via a SIP framework. Moreover, notes previously taken and/or information provided manually and/or automatically by the communications system can be provided to an agent (e.g., ACD, receptionist) receiving the conversation, at any point in the conversation chain for quick identification not only of the conversation source but of previous information already collected.

19 Claims, 12 Drawing Sheets

(56) References Cited

U.S. PATENT DOCUMENTS

| | | | | |
|---|---|---|---|---|
| 7,233,980 | B1 * | 6/2007 | Holden et al. | 709/219 |
| 7,596,599 | B1 * | 9/2009 | Maghsoodnia et al. | 709/206 |
| 7,689,232 | B1 * | 3/2010 | Beyer, Jr. | 455/457 |
| 7,899,915 | B2 * | 3/2011 | Reisman | 709/228 |
| 8,027,335 | B2 * | 9/2011 | Ansari et al. | 370/353 |
| 2003/0032448 | A1 * | 2/2003 | Bulthuis et al. | 455/556 |
| 2003/0135565 | A1 * | 7/2003 | Estrada | 709/206 |
| 2003/0177242 | A1 | 9/2003 | Trossen et al. | |
| 2003/0187988 | A1 * | 10/2003 | Lee et al. | 709/227 |
| 2003/0197729 | A1 * | 10/2003 | Denoue et al. | 345/751 |
| 2003/0217165 | A1 * | 11/2003 | Buch et al. | 709/229 |
| 2004/0086102 | A1 | 5/2004 | McMurry et al. | |
| 2004/0107235 | A1 * | 6/2004 | Koskelainen | 709/200 |
| 2004/0193740 | A1 * | 9/2004 | Kasmirsky et al. | 710/1 |
| 2004/0203664 | A1 | 10/2004 | Lei et al. | |
| 2005/0010407 | A1 * | 1/2005 | Jaroker | 704/235 |
| 2005/0021626 | A1 * | 1/2005 | Prajapat et al. | 709/205 |
| 2005/0213518 | A1 * | 9/2005 | Ahya et al. | 370/276 |
| 2005/0275541 | A1 * | 12/2005 | Sengupta et al. | 340/573.1 |
| 2006/0004914 | A1 * | 1/2006 | Kelly et al. | 709/219 |
| 2006/0123116 | A1 * | 6/2006 | Rahman et al. | 709/227 |
| 2006/0153357 | A1 | 7/2006 | Acharya et al. | |
| 2006/0165060 | A1 * | 7/2006 | Dua | 370/352 |
| 2006/0265451 | A1 * | 11/2006 | Tomimori | 709/204 |
| 2007/0027920 | A1 * | 2/2007 | Alvarado et al. | 707/104.1 |
| 2007/0036284 | A1 | 2/2007 | Raghav et al. | |
| 2007/0055995 | A1 * | 3/2007 | Jiang | 725/62 |
| 2007/0106567 | A1 * | 5/2007 | Harvey et al. | 705/26 |
| 2007/0107039 | A1 * | 5/2007 | Miyakawa et al. | 725/142 |
| 2007/0123300 | A1 * | 5/2007 | Park et al. | 455/556.1 |
| 2008/0039966 | A1 * | 2/2008 | Redgewell et al. | 700/94 |
| 2008/0170676 | A1 * | 7/2008 | Douma et al. | 379/114.13 |
| 2008/0189366 | A1 * | 8/2008 | Cox et al. | 709/204 |
| 2008/0240407 | A1 * | 10/2008 | Srinivasa-Murthy et al. | 379/265.11 |
| 2009/0070401 | A1 * | 3/2009 | Welch, Jr. | 709/201 |
| 2009/0074159 | A1 * | 3/2009 | Goldfarb et al. | 379/88.13 |
| 2009/0249244 | A1 * | 10/2009 | Robinson et al. | 715/781 |
| 2010/0049874 | A1 * | 2/2010 | Chene et al. | 709/246 |
| 2010/0241711 | A1 * | 9/2010 | Ansari et al. | 709/205 |

OTHER PUBLICATIONS

"Setting Up Call Handling: Cisco IOS Survivable Remote Site Telephony Version 3.2 System Administrator Guide".

"What's New in Office Communicator 2007", 2008, Microsoft Corporation.

* cited by examiner

EXTENSIBLE AND SECURE TRANSMISSION OF MULTIPLE CONVERSATION CONTEXTS

BACKGROUND

Call communications systems such as automated call transfer systems, as well as live call assistants continue to lack efficient means for sending notes and other information along with a call transfer. Consider the scenario where a receptionist uses a communications client to handle a conversation with a caller. The receptionist may want to take brief notes regarding this call and then transfer the call to a different person, the intended recipient, or consult another person before transferring the call.

Consider another scenario where a user receives a call through an automatic call distributor (ACD) infrastructure via the user communications client. The ACD infrastructure can be configured to provide additional information about the caller (such as the language preference chosen by the caller or other menu options that the caller may already have navigated through).

In these and other scenarios, the additional notes and information, which could be beneficial to one or all parties, are typically dropped or not passed on because of cumbersome mechanisms.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates a mechanism that provides multiple "call contexts" in multiple formats to the recipient of a communications exchange (e.g., voice call, conversation, text exchange via instant messaging, etc.) with detailed information about the contexts (e.g., when the context was created, who created the context, etc.) and provide this securely, if desired. In addition, the contexts can be transferred to other calls.

In an IP-based call infrastructure, a source of the call contexts (e.g., a receptionist or an ACD server) can provide the call context as a multipart/mixed MIME (multipurpose Internet mail extensions) message or secure-MIME (S-MIME) as part of a SIP (session initiation protocol) implementation. S-MIME can be employed for non-repudiation or encryption. For example, INVITE, REFER and/or INFO messages instruction with one MIME part (a document in MIME format) dedicated to the traditional SDP (session description protocol) payload and other parts dedicated to other call-contexts (with each call context itself using multipart/alternative to deal with multiple sub parts). For security and privacy, an IRM (information rights management) model can be layered on top, if desired.

The architecture facilitates the accumulation and transmission of notes along the call chain. For example, if the original caller had been previously transferred with notes, notes that came with the original call as well as the notes taken by the receptionist can be sent, individually or as a set. Moreover, notes previously taken and/or information provided manually and/or automatically by the system can be provided to the agent receiving the call, at any point in the call chain for quick identification not only of the caller but of previous information already collected.

The architecture also handles metadata associated with each context that provides content description about the context. A mechanism is provided to notify a user that there is additional information about the call that can be accessed and viewed. Additionally, a mechanism is provided for dealing with clients that do not support sending or receiving contexts (published via presence, as well as via SIP headers and error notifications).

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
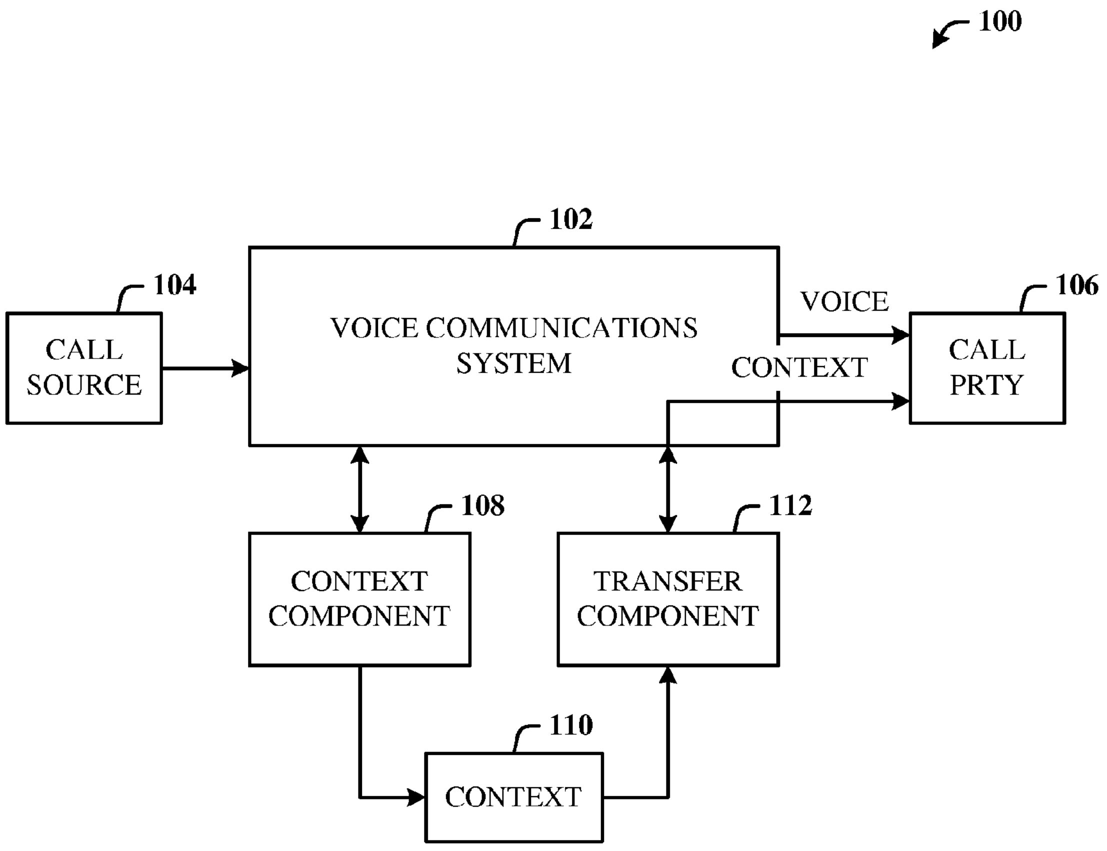
FIG. 1 illustrates a computer-implemented information sharing system for sharing context.

The disclosed architecture facilitates the accumulation and transmission of notes along a conversation chain. The conversation chain is intended to include any means of communication between two or more entities (e.g., users, systems) such as voice calls, text exchange, multimedia exchange, video, and so on. For example, if an original caller had been previously transferred with notes, notes that followed the original caller as well as the notes taken by the receptionist can be sent, individually or as a set. Moreover, notes previously taken and/or information provided manually and/or automatically by the system can be provided to an agent receiving the call, at any point in the call chain for quick identification not only of the caller but of previous information already collected.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented information sharing system 100 for sharing context. Note that although described in a voice communications environment, it is to be understood that other communications systems can be employed to benefit from the sharing of context, such as instant messaging, for example. The system 100 can include voice communications system 102 (e.g., a telephone system) for enabling voice communications between a call source 104 and a call party 106. A context component 108 is provided to allow the call source 104 (e.g., a receptionist, software agent, ACD (automated call distributor), etc.) for electronically recording and storing context 110 (e.g., conversation, call, etc.) in association with communications of the voice communications system 102. A transfer component 112 allows the context 110 then to be transferred to call party 106 of the voice communication. The context 110 can include notes entered by a receptionist when answering the call for the call party 106, links (e.g., hyperlinks), and/or multimedia content (e.g., audio file attachments, video files, text documents, etc.).

The transfer component 112 makes the context 110 accessible to the call party 106 before entering the voice communication (e.g., phone call), during the voice communication session, and/or after the voice communication session is over. Moreover, the context can be transferred to other voice communication sessions, as well.

In one implementation, the system 100 is employed in an IP-based communications system (e.g., voice) such that a conversation occurs over an IP network. For example, in a SIP (session initiation protocol)-based call infrastructure, a receptionist or an ACD server can provide the call context as a multipart/mixed MIME (multipurpose Internet mail extensions) message or secure-MIME (S-MIME) as part of the SIP implementation. S-MIME can be employed for non-repudiation or encryption. as part of the SIP implementation. SIP messages such as INVITE, REFER and/or INFO can be employed to transmit the context. The multipart/mixed MIME message can include one MIMEpart (a document in MIME format) dedicated to an SDP (session description protocol) payload and other parts dedicated to other call-contexts (with each call context itself using multipart/alternative to deal with multiple sub parts). For security and privacy, an IRM (information rights management) model can be layered on top, if desired. Additionally, privacy, integrity, and non-repudiation can be obtained using PKI (public key infrastructure), as well as S-MIME.

In one example, the architecture can be extended to a shared line appearance scenario. Here, the supervisor has a private key (e.g., PKI key) that can be sent to the administrator so that the administrator can open the encrypted incoming context.

Alternatively, context can be transmitted using out-of-band REFER. For example, User A is in a call with User B, and User A wants to transfer the call to User C. User A sends a REFER message to User C directly with the context. User C then sends an INVITE with replaces to User B.

The system 100 can provide multiple call contexts in similarly multiple formats to a recipient of a call with detailed information about the contexts. The contexts can be transferred to other calls, as well.

Conversation history can be stored as an email in the email system (e.g., email server). Notes associated with the conversation (and also in case of missed calls) can also be stored in the history. A conversation can be started at anytime by using this missed call or conversation history item. In that case, the notes associated with the history email can then be automatically associated with the call and processed for forwarding as described herein.

The context 110 can also be transmitted by way of a presence document. For example, User A is in a call with User B. User A wants to transfer to User C. User A then publishes context in a presence document that is visible only to User C. User C receives the transferred call from User B, and User C notices that User A transferred the context. User C then pulls the presence document of User A to get any context that User A may have published.

Figure 2:
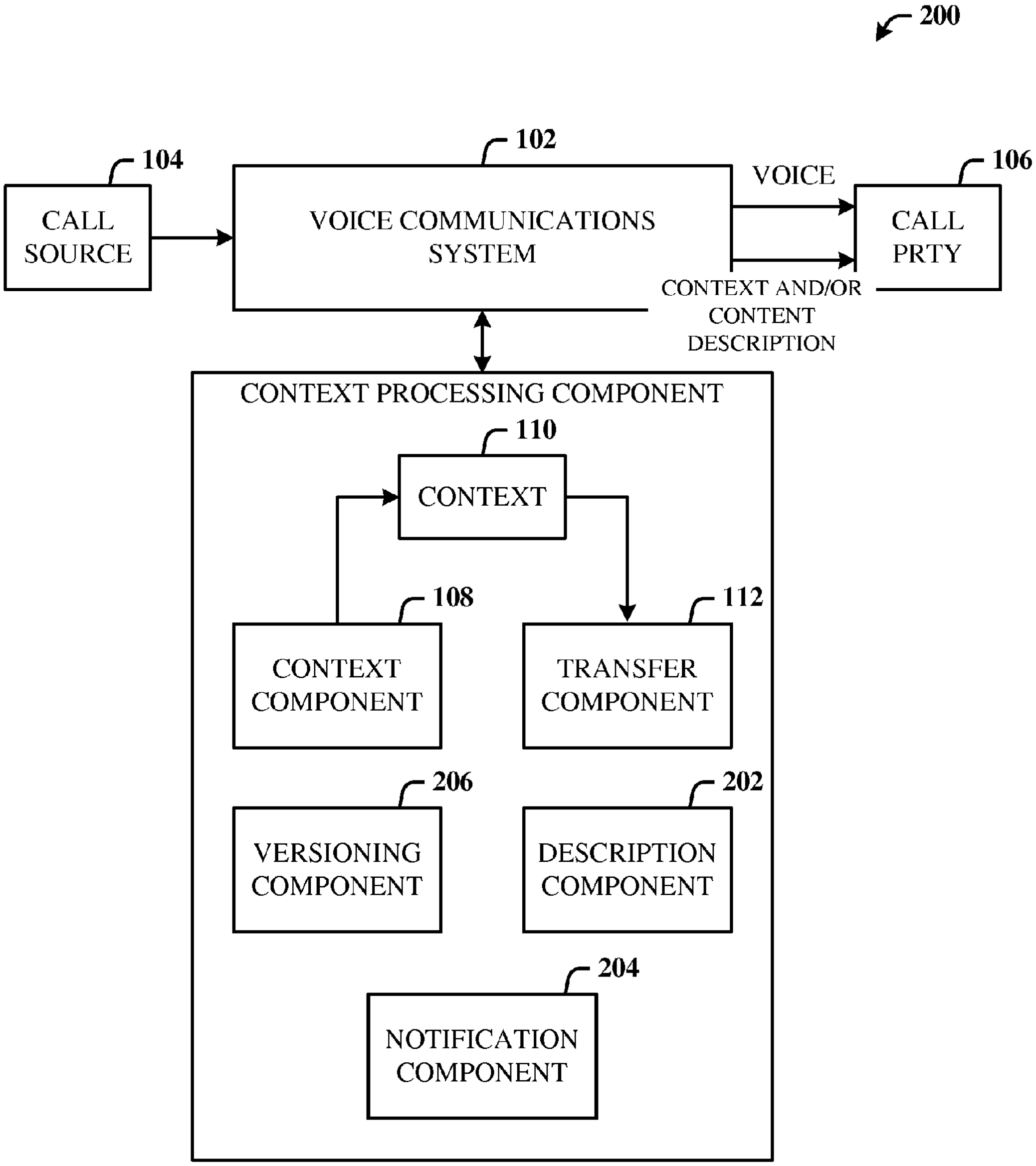
FIG. 2 illustrates a more detailed exemplary system for sharing call context in a telephone system.

FIG. 2 illustrates a more detailed exemplary system 200 for sharing call context in a telephone system. The system 200 includes the voice communications system 102 for connecting a call between the call source 104 and the call party 106, the context component 108 for creating electronically recording and storing notes as part of a call (conversation) context 110 in association with a conversation (e.g., phone call, text message) of an IP communications (e.g., telephone) system (e.g., IP-based call infrastructure), and the transfer component 112 for transferring the notes to the call party 106 via the telephone system. The call (conversation) context 110 can be transmitted using an encryption technology and as a multipart/mixed MIME message according to SIP messages that include at least one of INVITE, REFER or INFO.

The system 200 can also employ a description component 202 for generating a content description for content of the call context 110. For example, the content can include identification information (e.g., name, source ID) of the calling source 104. The transfer component 112 can then transfer one or both of the notes and content description to the call party 106 of the phone call via the telephone system. Alternatively, the transfer component 112 can transfer the context to the party via a presence document. The content description can be metadata associated with each context that provides a content description about the context.

The system 200 can comprise a notification component 204 for notifying the call party 106 of the presence of the context and/or content description via the voice communication system. Client support for sending, receiving context or transfer failures is conveyed (published) via a presence system as well as SIP headers and error notifications. Once notified, the call party 106 can access and view the context 110. The system 200 can further include a versioning component 206 for managing versions of the context 110 as generated and transmitted.

Figure 3:
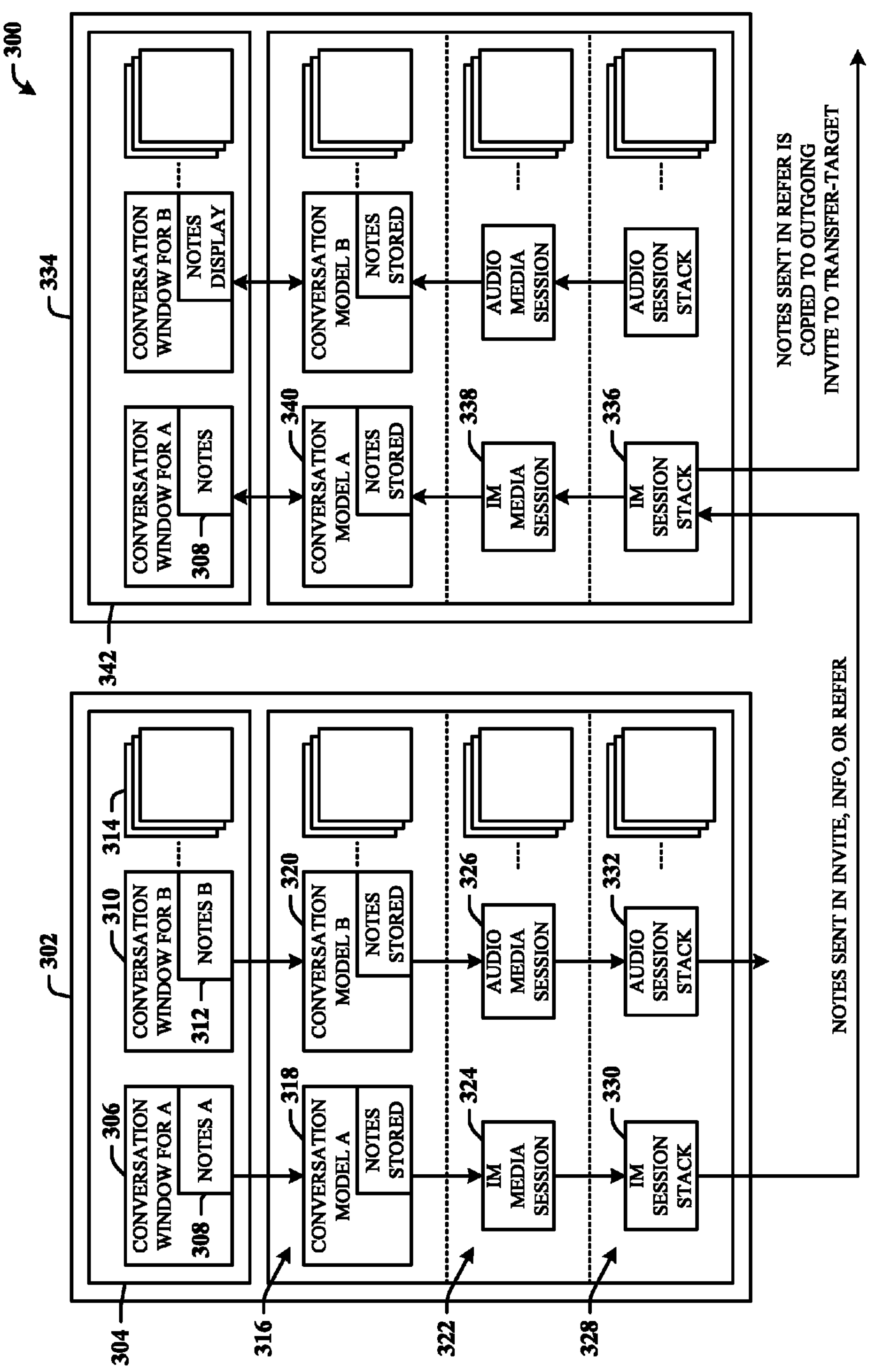
FIG. 3 illustrates a more detailed system for sharing notes between communications clients.

FIG. 3 illustrates a more detailed system 300 for sharing notes between communications clients. Here, a first communications client 302 is illustrated with a first user interface (UI) 304 for user interaction with one or more functionalities described herein. The user (a receptionist) can interact via the first UI 304 to view and/or create notes based on one or more phone communications sessions. For example, the first UI 304 can present a first conversation window 306 via which a first set of notes 308 can be entered and/or viewed. Additionally, the first UI 304 can present a second conversation window 310 via which a second set of notes 312 can be entered and/or viewed. It is to be understood that other windows 314 for other sessions can be open or reduced as the user desires.

In a typical implementation, the first communications client 302 can be for a receptionist computing system of a receptionist who receives the incoming call, interacts with the calling party, enters the first notes 308 about the calling party, and then forwards the first notes 308 to another entity (e.g., another communications client of the called party).

The first communications client 302 can also include conversation models 316 that support the associated conversation windows. For example, a first conversation model 318 interfaces to the first conversation window 306 for the storage of the first notes 308. Similarly, a second conversation model 320 interfaces to the second conversation window 310 for the storage of the second notes 312.

The first communications client 302 also provides the capability to support the different media sessions 322. For example, a first instant messaging (IM) media session 324 is utilized to transmit the notes 308 to another client via an IM message, and a first audio media session 326 can utilized to transmit the notes 312 to another client via audio signals. In support thereof, the first communications client 302 includes communications session stacks 328 (e.g., SIP) for transmitting the notes to other clients using the particular mode of communications (e.g., IM, audio, etc.). For example, the first notes 308 can be sent to another client (e.g., of the called party) via the first IM media session 324 and an associated first IM media communications session stack 330, and the second notes 312 can be sent to another client (e.g., of the called party) via the first audio media session 326 and an associated first audio media communications session stack 332.

The above description describes sending the first notes 308 and the second notes 312 to the same called party client. This is because it can be a common scenario where the called party will be on a call with a first calling party, and the receptionist will answer a second incoming call for the same called party, the incoming call from a second calling party. Thus, rather than interrupt the called party, the receptionist can now simply create notes to send to the called party such the called party can review the notes without interruption to the current call session, and then decide to terminate the existing call or remain on the line with the existing call.

As illustrated, the notes 308 are transmitted from the first communications client 302 via the first IM session 324 to a second client 334 through a second IM session stack 336 through an associated second IM media session 338 to the conversation model 338 for storage. The notes 308 can be sent via SIP using an INVITE, INFO, and/or REFER messages, for example. The called party then receives notification of the notes 308 available for review, and can then view the notes 308 via a second UI 342 of the second client 334.

It is further possible that the called party of the second communications client 334 chooses to forward the second calling party to a colleague to take the call. Thus, the calling party can change and/or add to the existing set of notes 308, and send the notes 308 to a third communications client (not shown) of the colleague using the IM stack 336. The colleague can then read the notes and pick up the call. In this case, the updated notes 308 or unedited notes can be sent in a SIP REFER message copied to an outgoing SIP INVITE message to the transfer-target (the colleague).

Following are example call flow diagrams, three of which illustrate common scenarios and a fourth call flow diagram illustrating the mechanisms.

Figure 4:
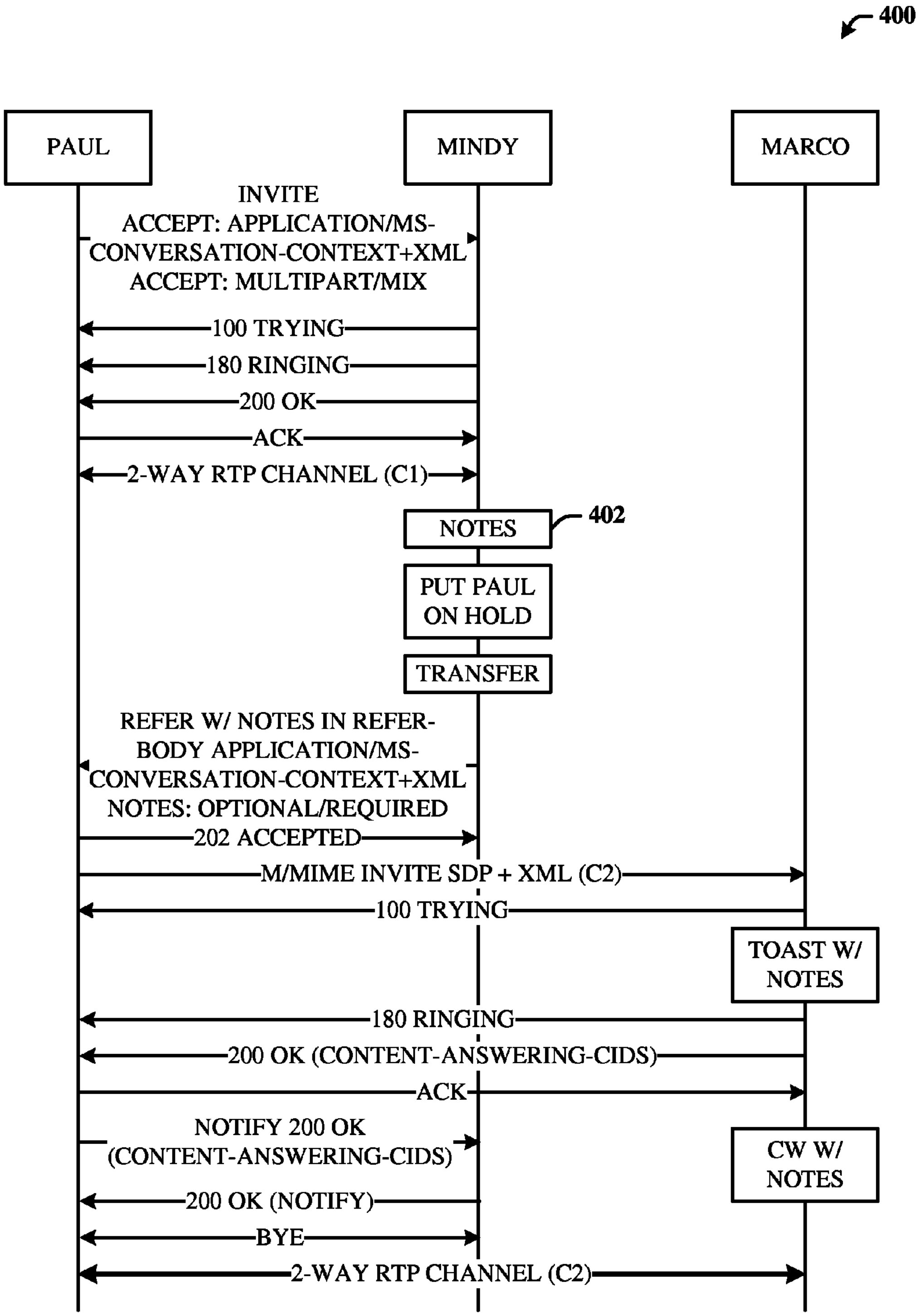
FIG. 4 illustrates an example call-flow diagram for a blind transfer with call context.

FIG. 4 illustrates an example call-flow diagram 400 for a blind transfer with call context. Shown is a basic case of Mindy talking with Paul and taking notes. Mindy decides to transfer Paul to Marco. Marco sees an incoming call from Paul. In the toast (a small informational window), Marco sees the notes that Mindy had entered earlier. Marco then accepts the call and views Mindy's notes in the conversation window.

The first part at the top of the diagram 400 is generally an accept pattern. This is used to identify legacy clients. Once the legacy clients are distinguished, the call flow shows a success pattern. The call client (Paul's client) indicates "yes" or "no" for supporting transfer of context. This information is useful in that Mindy's client then understands whether notes can be included or not. Here, notes can be included, and Mindy will be presented with a check box in the UI to indicate as such.

Consider an example where Paul has a computer problem and Mindy takes some notes about the problem and asks Paul some basic questions such as "Is your computer running?", "Do you have a blank screen?", "What are the symptoms?, etc., and enters notes about each query. This is illustrates with the notes block 402.

Next, Mindy puts Paul on hold and seeks out Marco to service the call and computer problems. Mindy checks a box in the client UI to include the notes before issuing the transfer to Marco.

The call is then transferred (TRANSFER) to take Mindy out of the connection and provides a direct connection between Paul and Marco. Following the transfer, Mindy's client sends a REFER with the notes in the REFER body taken as the MIMEpart. The information passed includes conversation context plus additional properties such as the selection of whether notes are optional or required in XML format.

Paul's client accepts and sends a new INVITE to establish a dialogue with Marco's client including the context. The call flow diagram 400 indicates that the notification that Marco gets before accepting the call can occur at the same time as the ringing. Once Marco hears the ringing, Marco can check for the notes via email (TOAST W/ NOTES), for example, as to the calling party and to the notes. Marco decides to accept the call from Paul (e.g., by clicking on an icon) and a new window opens which then shows the notes again to Marco to have the notes accessible when speaking with Paul. The content-answering-CIDs indicate to Paul whether the notes were accepted or not by Marco. Feedback to Paul's client can also include the situation where Marco's client does not know how to render the notes, but still was able to accept the call. This information can then flow back to Mindy.

More specifically, if the transferee client indicates that it supports transferring notes (via Supported:ms-referred-body), then the transferor can add conversation-context to the Refer-Body as a MIME part. The transferee echoes the conversation-context back to the transfer-target in the outgoing invite.

It can also be the situation that the transferee consumes some part of the Refer-Body. Therefore, the transferor adds the MIME header ms-referred-body in Content-Disposition to indicate identify the parts that will be sent to the transfer-target. By default, the parts without this header can be consumed by the transferee. The transferee may reject the REFER with a 415 message if there are any MIME parts with handling=required and without ms-referred-body that the client does not understand. When transferor receives a 415 message for a REFER, the transferor can retry sending MIME with handling=optional, or simply retry without MIME in the Refer-Body.

Note that if the MIME in Refer-Body is nested, the ms-referred-body can be specified on the root MIME parts. If there are SDPs in the Refer-Body, the transferee can strip the SDPs out before copying the Refer-Body in the INVITE.

Figure 5:
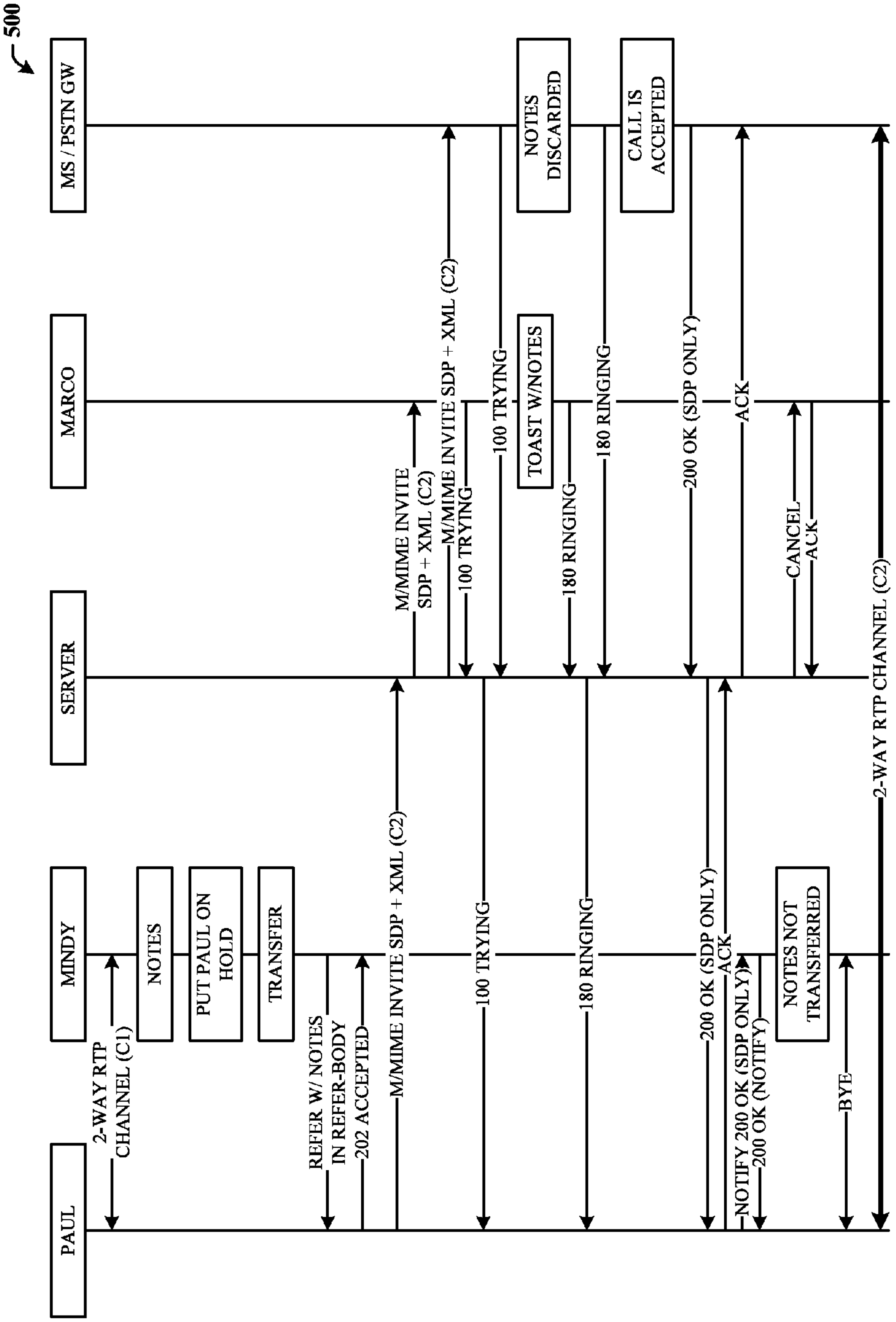
FIG. 5 illustrates an example call-flow diagram where the transfer target cannot accept notes.

FIG. 5 illustrates an example call-flow diagram 500 where the transfer-target cannot accept notes. In this example, Mindy talks to Paul, takes notes, puts Paul on hold, and then initiates the transfer from Paul to Marco. The transfer includes a SIP INVITE through a communications server to Marco. The transfer also includes sending the INVITE from the server to the PSTN (public switch telephone network) via a PSTN gateway. Marco has set “simul” ring to his cell phone. Thus, Marco receives an incoming call on a computer (running the communications client) and his cell phone.

The toast in Marco’s communications client shows the notes that Mindy entered. Marco is away from the desktop, and picks up the call on his cell phone. Mindy is notified that Marco did not receive the notes at the endpoint where the call was picked up.

Figure 6:
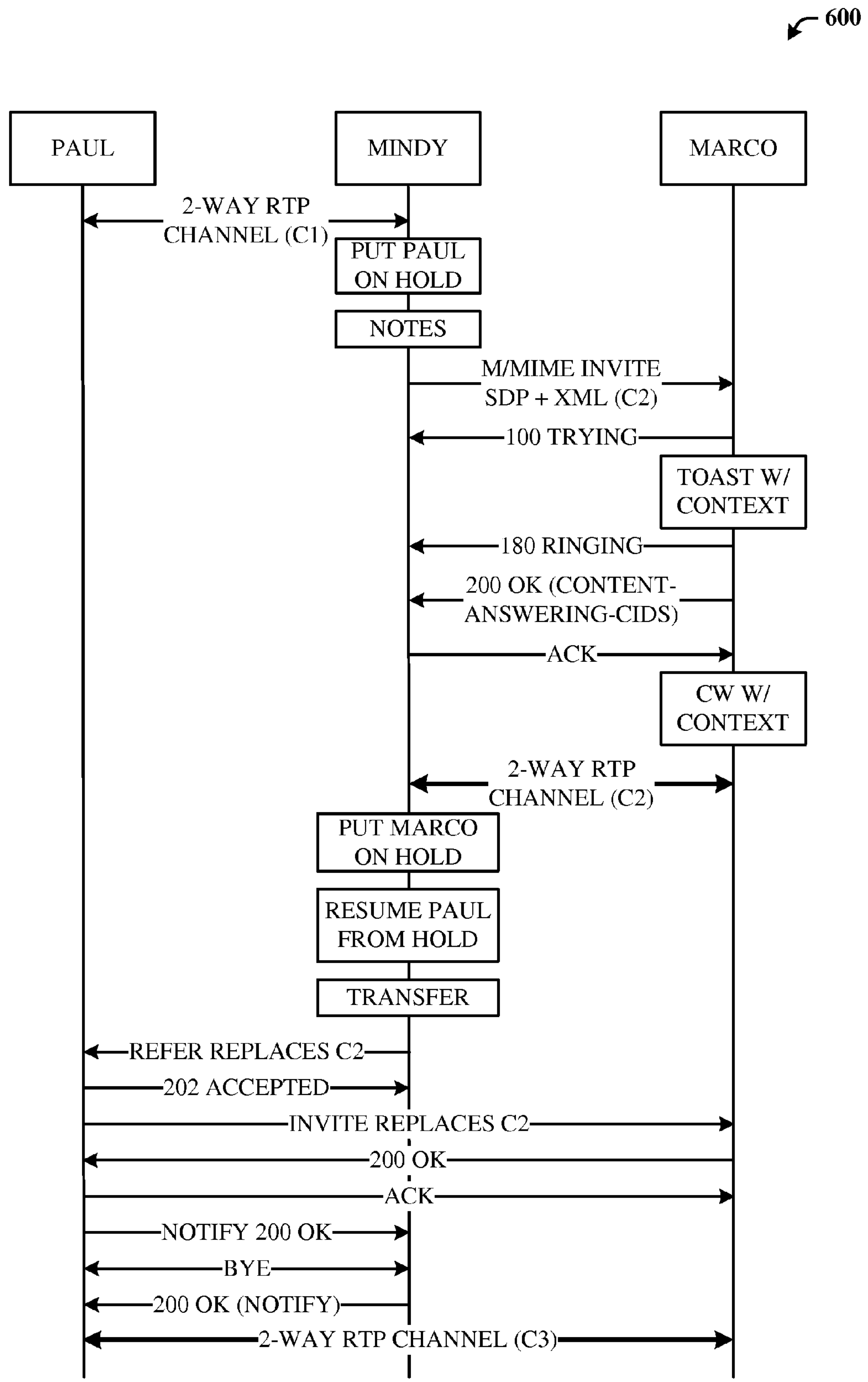
FIG. 6 illustrates an example call-flow diagram where the transfer of notes includes a consultation by audio.

FIG. 6 illustrates an example call-flow diagram 600 where the transfer of notes includes a consultation by audio. Here, Mindy talks to Paul over a two-way SIP channel and takes notes (NOTES). Mindy puts Paul on hold, and calls Marco to see if he would take Paul’s call. The notes are sent to Marco via a SIP INVITE, and Marco speaks with Mindy, and looks at Mindy’s notes (via a toast, with context) to confirm that Marco will take Paul’s call. Mindy puts Marco on hold, resumes Paul from hold and then completes the transfer. Marco can see Mindy’s notes while Marco talks to Paul.

Figure 7:
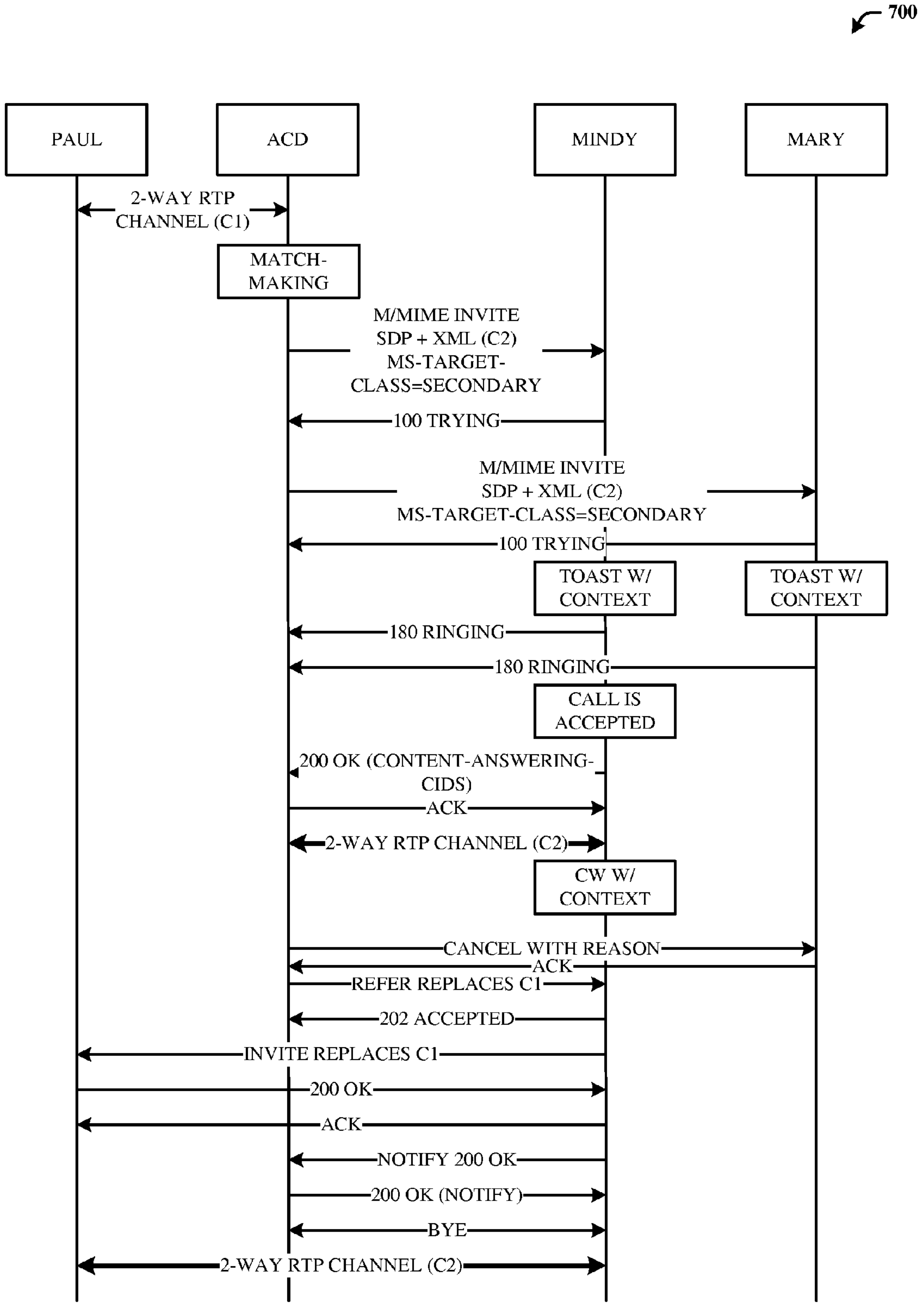
FIG. 7 illustrates an example call-flow diagram where the transfer occurs with consultative context.

FIG. 7 illustrates an example call-flow diagram 700 where the transfer occurs with consultative context. This call flow only describes the scenario when a conversation-context is added by an ACD. Paul calls the main number of a company and is directed to interaction with the ACD via a two-way RTP (realtime transport protocol) channel. Paul navigates through a voice menu and selects to speak with someone working on a project. The ACD connects to Mindy and Mary, who receive an incoming call and see that Paul, a premium customer of the company, is calling about the project. Both Mindy and Mary can view context associated with the call, as provided by the ACD, and presented via toast. Mindy is available and picks up Paul’s call. Mary stops ringing and sees that Mindy picked up the incoming call.

Following are additional details on an exemplary format of the MIME messages used to share call context. SIP INVITEs have multipart/alternative parts within multipart/mixed. The italicized section is for ms-conversation-context. The underlined section can accommodate ICE (information and content exchange) support. The alternative MIME for ms-conversation-context can be used for sending content-types (e.g., images) that some clients may not understand.

MIME-Version: 1.0<br>
Content-Type: multipart/mixed; boundary=UniqueBoundary1<br>
--UniqueBoundary1<br>
Content-Type: multipart/alternative; boundary=UniqueBoundary3<br>
Content-Disposition: session;handling=required<br>
--UniqueBoundary3<br>
Content-Type: application/SDP<br>
<SDP><br>
--UniqueBoundary3<br>
Content-Type: application/SDP<br>
<SDP><br>
--UniqueBoundary3--<br>
*--UniqueBoundary1-*<br>
*Content-Type: application/ms-conversation-context*<br>
*Content-ID: “Some string. E.g.* Id1@name.microsoft.com”<br>
*Content-Disposition: inline;handling=required*<br>
*<context data goes here>*<br>
--UniqueBoundary1<br>
Content-Type: multipart/alternative; boundary=UniqueBoundary2<br>
Content-ID: “Some string”<br>
Content-Disposition: inline;handling=required<br>
--UniqueBoundary2<br>
Content-Type: application/ms-conversation-context<br>
Content-ID: “Some string. E.g. Id2@name.microsoft.com”<br>
Content-Disposition: inline;handling=optional -continued <context data goes here><br>
--UniqueBoundary2<br>
Content-Type: application/ms-conversation-context<br>
Content-ID: “Some string. E.g. Id3@name.microsoft.com”<br>
Content-Disposition: inline;handling=optional<br>
<context data goes here><br>
--UniqueBoundary2--

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
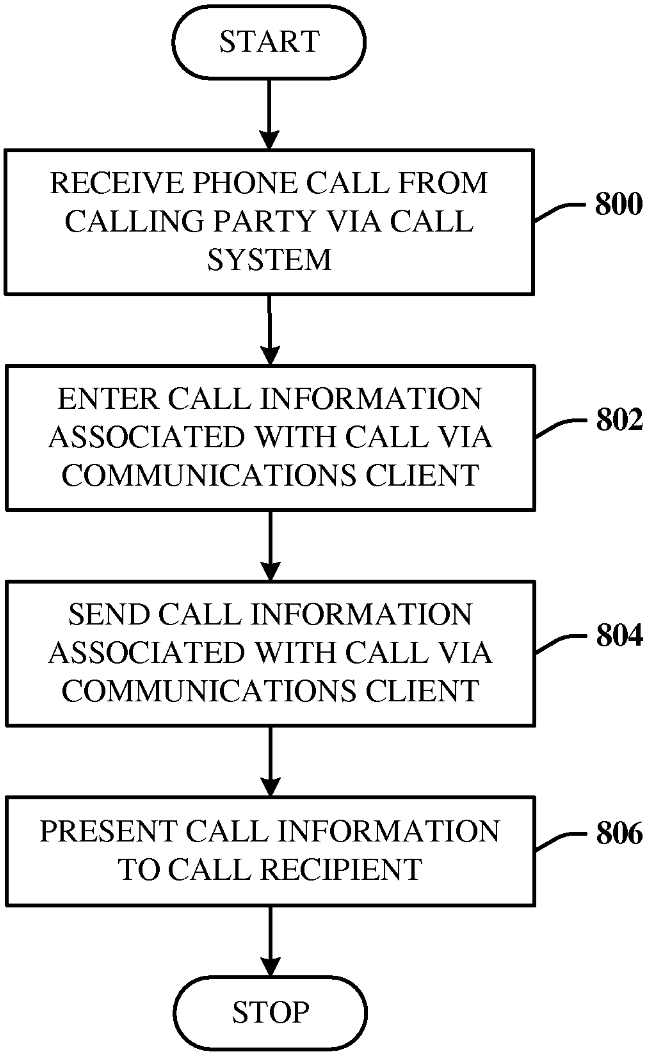
FIG. 8 illustrates a computer-implemented method of sharing call information.

FIG. 8 illustrates a computer-implemented method of sharing call information. At 800, a phone call is received from a calling party via a call system. At 802, call information (e.g., notes, call topic, calling party name, location, etc.) associated with the call is entered via a communications client. At 804, the call information is sent to a call recipient via the communications client. At 806, the call information is presented to the call recipient. This process can also include sending a notification to the call recipient that call information is available for viewing. The notification can be related to the status of the delivery of the call information.

The method can further comprise sending the call information in multiple different communications formats using correspondingly different communications technologies via the communications client using SIP INVITE, REFER, and/or INFO messages. The method can further comprise receiving the call information in an encrypted format using a private key, sending the private key to a third party via a presence channel, and opening the call information for the call recipient using the private key.

The method can also comprise protecting the call information during the sending of the call information using information rights management technology or S-MIME. The disclosed architecture is extensible such that the call information can be extended with new call information via a third-party application.

The method can further comprise identifying if a recipient system of the call recipient can receive and process the call information and sending a notification related to status of delivery of the call information, and consulting with the call recipient using voice signals while the call recipient reviews the call information.

Figure 9:
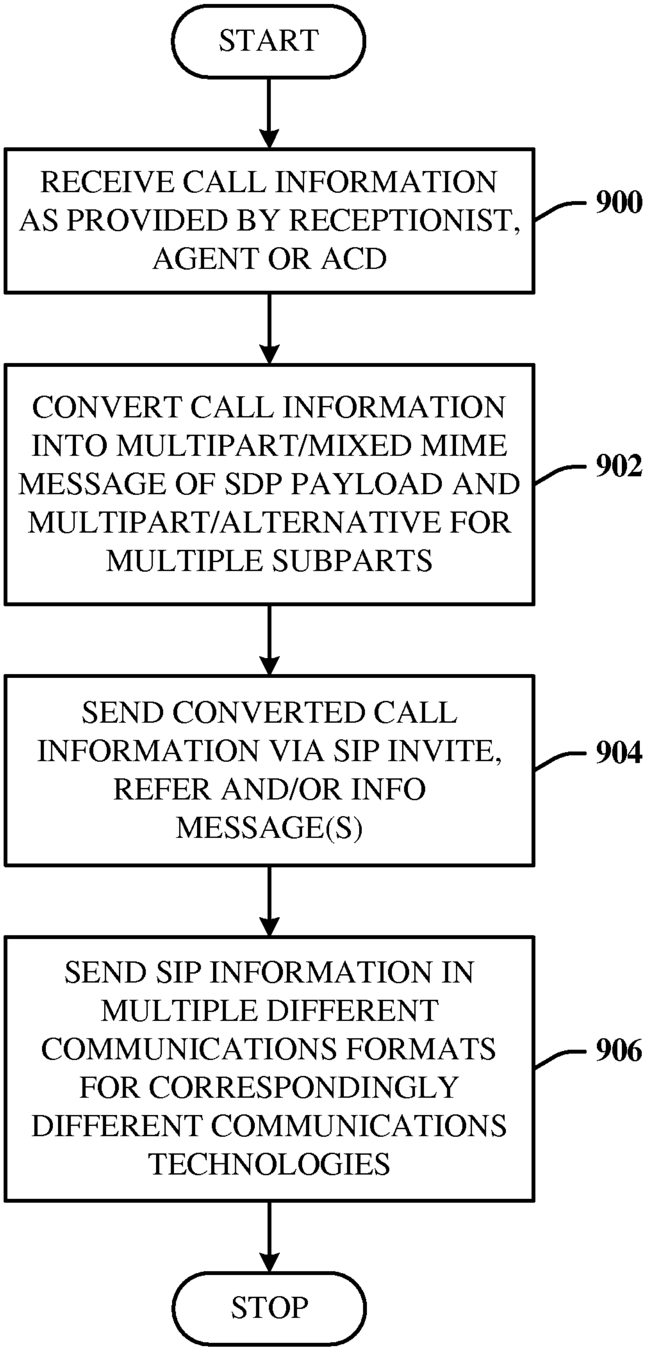
FIG. 9 illustrates a method of sending call information using MIME.

FIG. 9 illustrates a method of sending call information using MIME. At 900, call information is received as provided by a receptionist, agent or ACD. At 902, the call information is converted into a multipart/mixed MIME message of SDP payload and multipart/alternative message for multiple subparts. At 904, the converted call information is sent via a SIP INVITE, REFER and/or INFO message(s). At 906, the SIP information is sent using multiple different communications formats (e.g., instant messaging, audio signals, etc.) for correspondingly different communications technologies.

Figure 10:
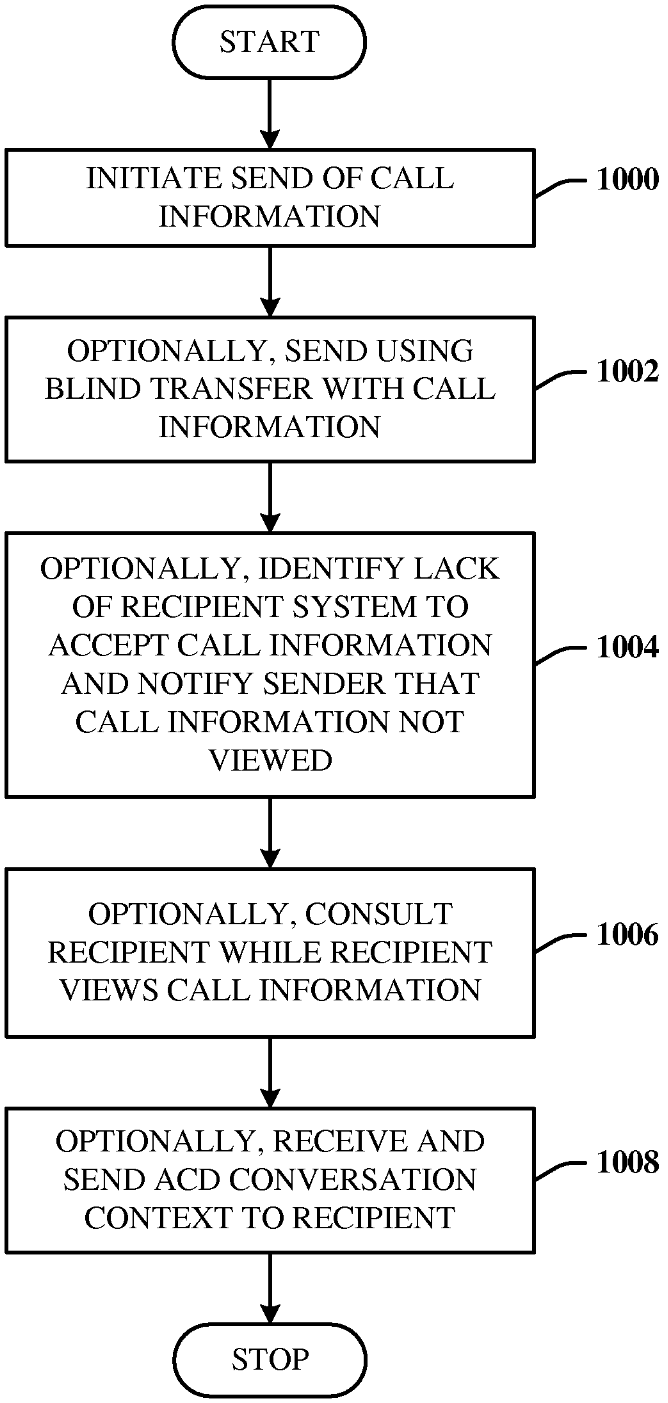
FIG. 10 illustrates a method of sending call information using optional techniques.

FIG. 10 illustrates a method of sending call information using optional techniques. At 1000, the user initiates send of call information via a communications client. The call information can be in the form of notes entered by a receptionist, for example. At 1002, optionally, the user can choose to send the call information blindly without first speaking to the call recipient. At 1004, optionally, the client application can identify that the recipient client lacks the capability to accept call information and notifies the user that the call information was not viewed. At 1006, optionally, the user can consult with the recipient while the recipient views the call information. At 1008, optionally, the calling party connects to an ACD such that conversation context is sent to the recipient before or during the call.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
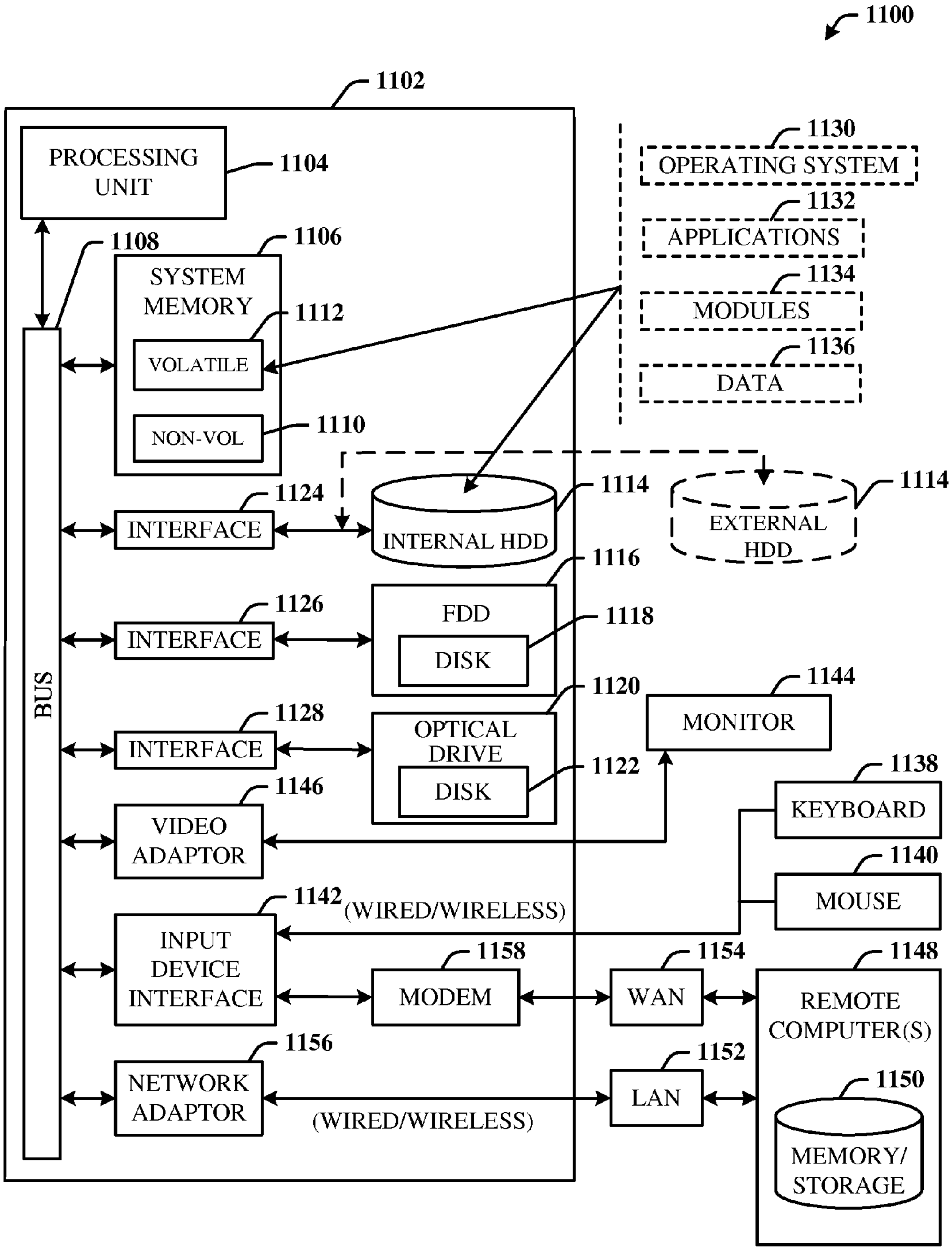
FIG. 11 illustrates a block diagram of a computing system operable to execute call context sharing in accordance with the disclosed architecture.

Referring now to FIG. 11, there is illustrated a block diagram of a computing system 1100 operable to execute call context sharing in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS are the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. The one or more application programs 1132, other program modules 1134, and program data 1136 can include the context component 108, context 110, transfer component 112, description component 202, notification component 204, versioning component 206, communications client 302, UI 304, conversation models 316, media sessions 322, session stacks 328, and SIP-based MIME messages, for example.

All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 12:
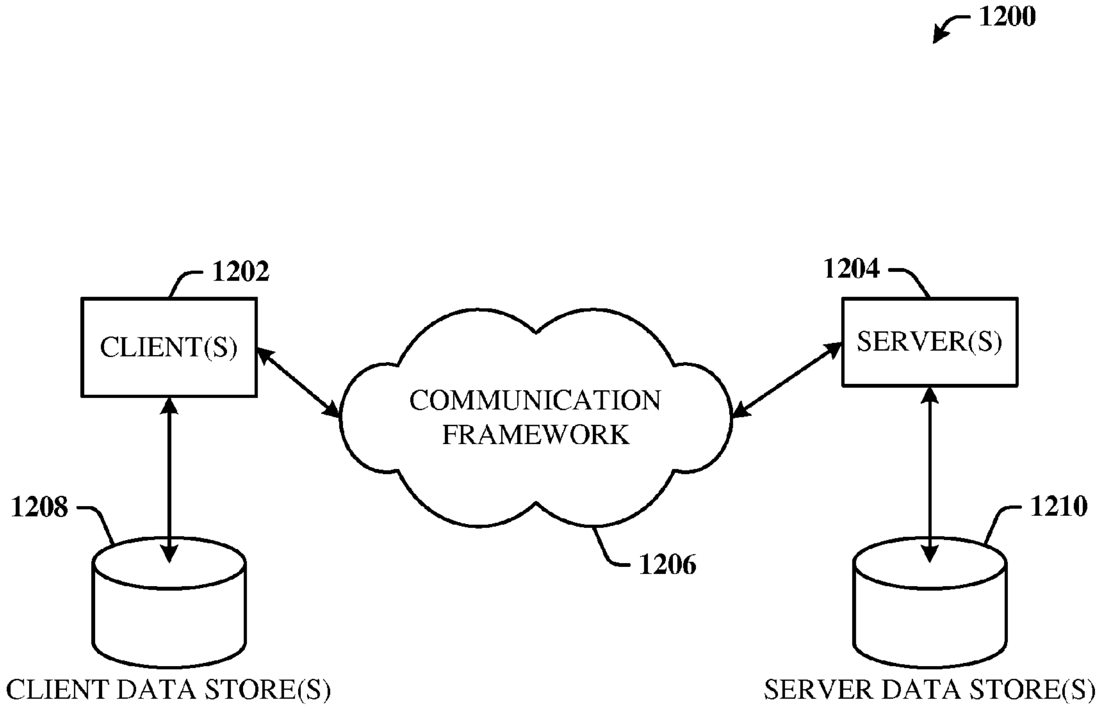
FIG. 12 illustrates a schematic block diagram of an exemplary computing environment that supports call context sharing.

Referring now to FIG. 12, there is illustrated a schematic block diagram of an exemplary computing environment 1200 that supports call context sharing. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The client(s) 1202 can be the communications clients 302 and 334, and the server(s) 1204 can be the communications server in the call flow diagram 500 via which the notes, call context, etc. are transmitted.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented information sharing system, comprising:

an input component for receiving data from an initial recipient of a telephonic call, the data comprising a context of the telephonic call, wherein the telephonic call is for a receiving party from a calling party;

a context component for electronically recording and storing the context in association with the telephonic call of a communications system;

a description component for generating a content description for content of the context;

a transfer component for receiving a call transfer request from the initial recipient and transferring the context and the content description with the transfer to the receiving party of the telephonic call, the context and the content description being transferred based on an indication received from the initial recipient after putting the calling party on hold, wherein the indication represents support for transfer of the context and the content description to the calling party; and a rendering component for rendering to the receiving party at least a portion of the content of the context and the content description including the data received from the initial recipient of the telephonic call, and wherein the at least a portion of the content and the content description being initially presented in a toast window before accepting the telephonic call and then in a conversation window based on acceptance of the telephonic call, wherein the input component receives a confirmation from the receiving party for the acceptance of transfer for the telephonic call based on the rendered content in the toast window, and the transfer component is completes transfer of the telephonic call to the receiving party based on the confirmation.

2. The system of claim 1, wherein the context includes at least one of notes, links, and multimedia content.

3. The system of claim 1, wherein the transfer component makes the context accessible to the receiving party before transferring the telephonic call.

4. The system of claim 1, further comprising a notification component for notifying the receiving party of the context via the communications system.

5. The system of claim 1, wherein the context is transmitted as a multipart/mixed MIME message in one or more SIP messages.

6. The system of claim 5, wherein the multipart/mixed MIME message includes a MIMEpart as an SDP payload and another MIMEpart for another context.

7. The system of claim 5, wherein the one or more SIP messages include one or more of INVITE, REFER, and INFO.

8. The system of claim 1, wherein the at least a portion of the content of the context and the content description is initially presented in a toast window.

9. The system of claim 1, wherein the context includes previous accumulated information associated with the telephonic communication.

10. A computer-implemented information sharing system, comprising:

an input component for receiving data input by an initial recipient of a telephonic conversation, the data comprising a context of a telephonic call, wherein the telephonic call is for a receiving party from a calling party;

a context component for electronically recording and storing the telephonic conversation context in association with a telephonic communication of an IP communications system, the telephonic conversation context including previous accumulated information associated with the telephonic conversation;

a description component for generating a content description for content of the telephonic conversation context;

a transfer component for receiving a call transfer request from the initial recipient for transferring the telephonic call to the receiving party and transferring the content of the telephonic conversation context and the content description to the receiving party via the IP communications system; and a rendering component for rendering to the receiving party at least a portion of the content and the content description including the data received from the initial recipient of the telephonic conversation, wherein the at least a portion of the content and the content description being initially presented in a toast window before accepting the telephonic call and then in a conversation window based on acceptance of the telephonic call, wherein the input component receives a confirmation from the receiving party for the acceptance of transfer for the telephonic call based on the rendered telephonic conversation context and the content description in the toast window, and the transfer component is completes transfer of the telephonic call to the receiving party based on the confirmation.

11. The system of claim 10, wherein the transfer component transfers the telephonic conversation context to the receiving party via a presence document.

12. The system of claim 10, further comprising a notification component for notifying the receiving party of the telephonic conversation context via the IP communications system, the notification component further notifying the initial recipient that the receiving party received the telephonic call and did not received the telephonic conversation context because of lack of support for receiving the telephonic conversation context.

13. The system of claim 10, wherein the telephonic conversation context is transmitted using an encryption technology and as a multipart/mixed MIME message according to SIP messages that include at least one of INVITE, REFER, and INFO.

14. A computer-implemented method of sharing telephone call information, the method comprising each of the following as implemented on a computer system:

receiving data from an initial recipient of a telephonic call, the data comprising a context of the telephonic call, wherein the telephonic call is for a receiving party from a calling party;

electronically recording and storing the context in association with the telephonic call of a communications system;

generating a content description for content of the context;

receiving a call transfer request from the initial recipient and transferring the context and the content description with the transfer to the receiving party of the telephonic call, the context and the content description being transferred based on an indication received from the initial recipient after putting the calling party on hold, wherein the indication represents support for transfer of the context and the content description to the calling party;

rendering to the receiving party at least a portion of the content of the context and the content description including the data received from the initial recipient of the telephonic call, and wherein the at least a portion of the content and the content description being initially presented in a toast window before accepting the telephonic call;

receiving a confirmation from the receiving party for the acceptance of transfer for the telephonic call based on the rendered content in the toast window and rendering the at least a portion of the content of the context and the content description in a conversation window based on acceptance of the telephonic call; and transferring the telephonic call to the receiving party based on the confirmation.

15. The computer-implemented method of claim 14, wherein the context includes at least one of notes, links, and multimedia content.

16. The computer-implemented method of claim 14 further comprising making the context accessible to the receiving party before transferring the telephonic call.

17. The computer-implemented method of claim 14, wherein the context is transmitted as a multipart/mixed MIME message in one or more SIP messages.

18. The computer-implemented method of claim 17, wherein the multipart/mixed MIME message includes a MIMEpart as an SDP payload and another MIMEpart for another context.

19. The computer-implemented method of claim 17, wherein the one or more SIP messages include one or more of INVITE, REFER, and INFO.

* * * * *